Figure 1:
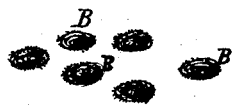

W. R. RICE.
Method of Manufacturing Felt for Hats, &c.

No. 210,270. Patented Nov. 26, 1878.

WITNESSES
W. C. Brookes
Chas. C. Stetson

INVENTOR
William R. Rice
by his attorney
Thomas D. Stetson

UNITED STATES PATENT OFFICE.

WILLIAM R. RICE, OF BRIDGEPORT, CONNECTICUT.

IMPROVEMENT IN METHODS OF MANUFACTURING FELT FOR HATS, &c.

Specification forming part of Letters Patent No. 210,270, dated November 26, 1878; application filed September 16, 1878.

*To all whom it may concern:*

Be it known that I, WILLIAM R. RICE, of Bridgeport, Fairfield county, in the State of Connecticut, have invented certain new and useful Improvements in the Method of Manufacturing Spotted Felt in Hats and other constructions of felt, of which the following is a specification:

The object is to decorate the goods with spots of fancy colors or of different shades from the main body.

Many efforts have been made to produce felt with party-colored decorations. I have succeeded in effecting such with wool material, and with bright and distinctly-defined spots of the desired small size irregularly distributed in the material.

I conduct the successive cardings of the material and the winding of the carded web many times crossing each other on the ordinary double former, and subsequently cutting the two hat-bodies thus made apart, and hardening and felting them by hand or by machinery, all in the ordinary manner; but previous to the introduction of the wool into the breaker or first carding-machine I sprinkle thereon or otherwise mix therewith, by hand or by any suitable machinery, a quantity of previously-formed knots or knubbles of wool, which subsequently become incorporated into the body.

To produce the knots, pellets, or knubbles, I take wool of the desired color or shade and overcard it, or card it to excess. The material may be quite short, but should not be shoddy or shearings. It must have sufficient length to be rolled up into the desired form, and to retain that form with persistence.

To produce the knubbles, I disconnect the clearing-comb from the carding-engine and introduce the wool until the carding-cylinder, with the proper workers and strippers, is well covered. I neglect entirely to comb it off. It thus becomes overcarded. When the overcarding has proceeded to a proper extent, and the wool is rolled up into knubbles of the required tightness, they will fall of themselves out of the machine. I receive them in a suitable spout or otherwise, and take them away. The knots or little balls of wool thus produced may vary in size within considerable limits; but I have in my experiments found them to be approximately uniform. The material of which they are formed allows them to unite firmly with the other fibers of wool among which they are distributed. The whole forms a strong and firm-bodied felt, and the decorative effect attained in my experiments is highly pleasing.

It will be understood that the breaking and carding of the wool having these knots intimately mixed therewith may be conducted in the same manner as the same wool would be without the knots. I have found but little tendency of the knots to become straightened out with the ordinary amount of carding. The treatment to which it is subjected in the carding-machine entangles the material of the knots very intimately with the other wool. The subsequent hardening and felting cause the other wool to firmly engage with and take hold of the knots.

My hats may be pounced and finished in the ordinary manner. I have found no tendency of the knots to interfere in any way with the finish or with the stiffness or strength of the felt. They simply decorate, while forming integral parts of the same character and strength as the other material.

I have operated successfully with the proportion of one ounce of knots to one pound of straight wool.

The accompanying drawings form a part of this specification.

Figure 2:
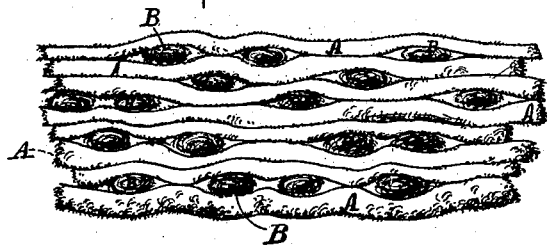
Figure 3:
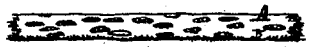

Figure 1 shows the knubbles before their incorporation into the wool. Fig. 2 is an edge view, showing the knubbles mixed with the straight wool and subjected to the several preliminary operations after they have been wound upon the former. Fig. 3 shows the same after the fabric has been felted.

Similar letters of reference indicate corresponding parts in all the figures.

A is the straight wool, or wool in the ordinary condition, wound in the several layers, with the fibers crossing each other, and adapted to unite and form a strong and hard fabric in a subsequent treatment, as usual. B are the knubbles of previously-prepared wool, which is incorporated with the fibers A and worked into a united fabric therewith in the manner above specified.

I use the term "wool" to indicate not simply what is technically known as wool, but also worsted and analogous fiber which will felt, as all kinds of fur.

I can, by properly operating, as will be obvious, make the knubbles B with red in the center and white outside. Either way the felting causes them to strongly engage with the other parts A. I can distribute the knubbles mainly on either face, or mainly in the interior, or uniformly, as fashion or other cause may dictate. I can, by this means, make not only hats, but skirts and other felted garments, as also felt in the piece, attractively decorated and with all its ordinary strength.

I claim as my invention—

The within-described method of producing spotted felt by overcarding wool of a different hue or shade and distributing the knots thus formed in the web in the forming of the felted article, substantially as and for the purposes herein specified.

In testimony whereof I have hereunto set my hand this 9th day of September, 1878, in the presence of two subscribing witnesses.

WILLIAM R. RICE.

Witnesses:
C. E. MOORE,
HIRAM C. RICE.